US012217345B2

(12) United States Patent
Qin

(10) Patent No.: US 12,217,345 B2
(45) Date of Patent: Feb. 4, 2025

(54) IMAGE PROCESSING METHOD AND APPARATUS, COMPUTER DEVICE, AND STORAGE MEDIUM FOR GAME ROLE GENERATION AND PERSONALIZATION

(71) Applicant: Tencent Technology (Shenzhen) Company Limited, Guangdong (CN)

(72) Inventor: Shiqing Qin, Guangdong (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 189 days.

(21) Appl. No.: 17/901,361

(22) Filed: Sep. 1, 2022

(65) Prior Publication Data
US 2022/0414964 A1 Dec. 29, 2022

Related U.S. Application Data

(63) Continuation of application No. PCT/CN2021/102602, filed on Jun. 28, 2021.

(30) Foreign Application Priority Data

Jul. 29, 2020 (CN) .......................... 202010745609.7

(51) Int. Cl.
G06T 13/40 (2011.01)
G06T 7/70 (2017.01)
G06V 40/16 (2022.01)

(52) U.S. Cl.
CPC ................ G06T 13/40 (2013.01); G06T 7/70 (2017.01); G06V 40/166 (2022.01); G06T 2207/30201 (2013.01)

(58) Field of Classification Search
None
See application file for complete search history.

(56) References Cited

U.S. PATENT DOCUMENTS 9,928,406 B2* 3/2018 Bhanu ................. G06V 40/176
11,110,358 B2* 9/2021 Ohashi ................. A63F 13/822
(Continued)

FOREIGN PATENT DOCUMENTS

CN 1797474 A 7/2006
CN 105447480 A 3/2016
(Continued)

OTHER PUBLICATIONS

Korshunova et al., "Fast Face-Swap Using Convolutional Neural Networks" (Year: 2017).*
(Continued)

Primary Examiner — Hilina K Demeter
(74) Attorney, Agent, or Firm — Sughrue Mion, PLLC

(57) ABSTRACT

An image processing method and apparatus, a computer device, and a computer-readable storage medium. The image processing method includes: displaying a first application page, the first application page including an original role object and a face fusion control; acquiring a user face image of a target user in a case that the face fusion control is triggered; and displaying a target role object on a second application page, the target role object being obtained by fusing the user face image and the original role object, a display angle of the target role object matching posture information of the target user, and the posture information of the target user being determined according to the user face image.

15 Claims, 13 Drawing Sheets

(56) References Cited

U.S. PATENT DOCUMENTS

| | | | |
|---|---|---|---|
| 2011/0034245 A1 | 2/2011 | Mimura | |
| 2013/0070093 A1* | 3/2013 | Rivera | G10H 1/365 |
| | | | 348/143 |
| 2017/0345183 A1* | 11/2017 | Chen | G06V 10/56 |
| 2019/0082118 A1* | 3/2019 | Wang | H04N 5/265 |
| 2020/0034996 A1* | 1/2020 | Qian | G06V 10/25 |
| 2020/0258206 A1* | 8/2020 | Shen | G06V 40/165 |
| 2021/0104086 A1* | 4/2021 | Wang | G06N 3/045 |
| 2021/0134036 A1* | 5/2021 | Guo | A63F 13/655 |
| 2021/0142566 A1* | 5/2021 | Dehais | G06T 15/20 |
| 2021/0291056 A1* | 9/2021 | Chen | A63F 13/655 |
| 2021/0374390 A1* | 12/2021 | Dai | G06T 5/50 |

FOREIGN PATENT DOCUMENTS

| | | | |
|---|---|---|---|
| CN | 107680167 A | 2/2018 | |
| CN | 107831902 A | 3/2018 | |
| CN | 108399383 A | 8/2018 | |
| CN | 109675315 A | 4/2019 | |
| CN | 111632374 A | 9/2020 | |
| CN | 111768479 A | 10/2020 | |

OTHER PUBLICATIONS

Nirkin et al., "On Face Segmentation, Face Swapping, and Face Perception" (Year: 2018).*
International Search Report for PCT/CN2021/102602 dated Sep. 17, 2021 [PCT/ISA/210].
Chinese Office Action for 2020107456097 dated Dec. 11, 2020.
Chinese Office Action for 2020107456097 dated Feb. 18, 2021.

* cited by examiner

ID_PROCESSING METHOD AND
APPARATUS, COMPUTER DEVICE, AND
STORAGE MEDIUM FOR GAME ROLE
GENERATION AND PERSONALIZATION

CROSS-REFERENCE TO RELATED APPLICATION(S)

This application is a continuation application of International Application No. PCT/CN2021/102602, filed on Jun. 28, 2021 which claims priority to Chinese Patent Application No. 202010745609.7, filed with the China National Intellectual Property Administration on Jul. 29, 2020, the disclosures of which are incorporated by reference in their entireties.

FIELD

The present disclosure relates to the field of computer technologies, and in particular, to an image processing method and apparatus, a computer device, and a storage medium.

BACKGROUND

With rapid development of Internet technologies, the video game industry becomes one of cultural and entertainment industries that keep pace with film, television, and music, which attracts wide attention of people from all walks of life such as enterprises and scholars with an amazing development speed and huge economic benefits.

Currently, users need to create game roles before engaging in game entertainment. The game roles are role templates designed in advance by developers, and users only need to select a male role or a female role. Subsequently, users may perform game entertainment in game applications based on the selected game roles. It can be learned that, in the related solution, users can only select game roles from the existing game role templates, which reduces flexibility of game role creation. In addition, since the role templates are commonly used, the created game roles are not personalized.

SUMMARY

The disclosure provides an image processing method and apparatus, a computer device, and a storage medium, which can improve flexibility of game role creation and create personalized game roles.

A first aspect of the disclosure may provide an image processing method, which is performed by a terminal device. The method includes: displaying a first application page, the first application page including an original role object and a face fusion control; acquiring a user face image of a target user in a case that the face fusion control is triggered; and displaying a target role object on a second application page, the target role object being obtained by fusing the user face image and the original role object, a display angle of the target role object matching posture information of the target user, and the posture information of the target user being determined according to the user face image.

Another first aspect of the disclosure may provide an image processing method, which is performed by a server. The method includes: acquiring a user face image of a target user and user face feature point information of the user face image; determining posture information of the target user according to the user face feature point information; and fusing the user face image and an original role object into a target role object according to the user face feature point information and the posture information, and determining a display angle of the target role object matching the posture information.

Another aspect of the disclosure may further provide an image processing apparatus, including: a first display module, configured to display a first application page, the first application page including an original role object and a face fusion control; a first acquisition module, configured to acquire a user face image of a target user in a case that the face fusion control is triggered; and a second display module, configured to display a target role object on a second application page, the target role object being obtained by fusing the user face image and the original role object, a display angle of the target role object matching posture information of the target user, and the posture information of the target user being determined according to the user face image.

Another aspect of the disclosure may further provide an image processing apparatus, including: a second acquisition module, configured to acquire a user face image of a target user and user face feature point information of the user face image; a first determination module, configured to determine posture information of the target user according to the user face feature point information; a fusion module, configured to fuse the user face image and an original role object into a target role object according to the user face feature point information and the posture information; and a second determination module, configured to determine a display angle of the target role object matching the posture information.

Another aspect of the disclosure may provide a computer device, including a memory and a processor. The memory stores a computer program. The computer program, when executed by the processor, causes the processor to perform the methods in the above embodiments.

Another aspect of the disclosure may provide a computer-readable storage medium. The computer-readable storage medium stores a computer program. The computer program includes program instructions. The program instructions, when executed by a processor, perform the methods in the above embodiments.

Another aspect of the disclosure may provide a computer program product or a computer program. The computer program product or the computer program includes program instructions. The computer instructions are stored in a computer-readable storage medium. The program instructions, when executed by a processor of a computer device, perform the methods in the above embodiments.

BRIEF DESCRIPTION OF THE DRAWINGS

To describe the technical solutions of example embodiments of this disclosure or the related art more clearly, the following briefly describes the accompanying drawings required for describing the embodiments or the related art. The accompanying drawings in the following description show only some embodiments of the disclosure, and a person of ordinary skill in the art may still derive other drawings from the accompanying drawings without creative efforts. In addition, one of ordinary skill would understand that aspects of example embodiments may be combined together or implemented alone.

DESCRIPTION OF EMBODIMENTS

Figure 1:
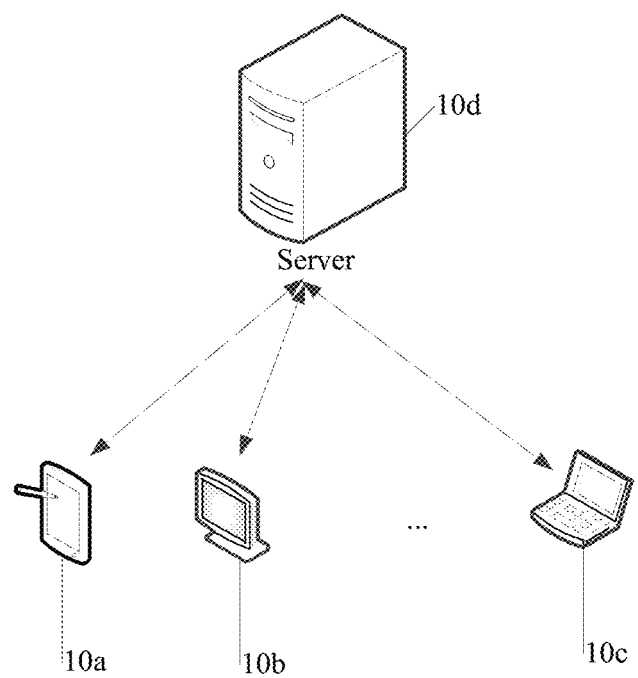
FIG. 1 is a system architecture diagram of image processing according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Artificial Intelligence (AI) is a theory, a method, a technology, and an application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning (DL).

The solutions provided in the embodiments of the disclosure belong to the computer vision (CV) technology in the field of artificial intelligence.

The CV technology is a science to make machines "see". Further, CV means machine vision that identifies, tracks, and measures targets by using cameras and computers instead of human eyes, and further performs graphic processing on results of the identification, the tracking, and the measurement, so that a computer processing result becomes an image more suitable for observation by human eyes or transmission to an instrument for detection. As a scientific subject, the CV studies related theories and technologies and attempts to establish an artificial intelligence (AI) system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In the embodiments of the disclosure, a 3D technology of the CV technology is mainly used. Specifically, a three-dimensional face image and a three-dimensional game role are fused to obtain a new three-dimensional game role with a user face feature. In a subsequent game application, a user may control the newly created personalized three-dimensional game role for game entertainment.

The embodiments of the disclosure are applicable to a game application, and are specifically applicable to the following scenario: When a user needs to customize a personalized game role, the user may trigger a face fusion control on a first application page of the game application, so that a terminal device captures a face image of the user, and displays a target role object on a second application page. Face features of the target role object are consistent with face features of the user, and a display angle of the target role object on the second application page matches posture information of the target user. Subsequently, the user may control the target role object to perform game battle, role-playing, and the like in the game application.

FIG. 1 is a system architecture diagram of image processing according to some embodiments, relating to a server 10d and a terminal device cluster. For example, the terminal device cluster may include: a terminal device 10a, a terminal device 10b, and a terminal device 10c.

The terminal device 10a is used as an example. The terminal device 10a displays a first application page. The first application page includes an original role object and a face fusion control. When a user triggers the face fusion control, the terminal device 10a captures a user face image of the user. The terminal device 10a sends the captured user face image to the server 10d. The server 10d fuses the user face image and the original role object into a target role object, and determines a display angle of the target role object on a second application page according to the user face image. The server 10d delivers the determined display angle and the target role object to the terminal device 10a, and the terminal device 10a displays the target role object on the second application page according to the delivered display angle.

Alternatively, the fusion of the user face image and the original role object into the target role object may be performed by any terminal device in the terminal device cluster.

The server 10d shown in FIG. 1 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

The terminal device 10a, the terminal device 10b, the terminal device 10c, and the like shown in FIG. 1 may be smart devices having image processing functions, such as mobile phones, tablet computers, notebook computers, handheld computers, mobile Internet devices (MID), or wearable devices. The terminal device cluster and the server 10d may be directly or indirectly connected through wired or wireless communication, which is not limited in this application.

Figure 2A:
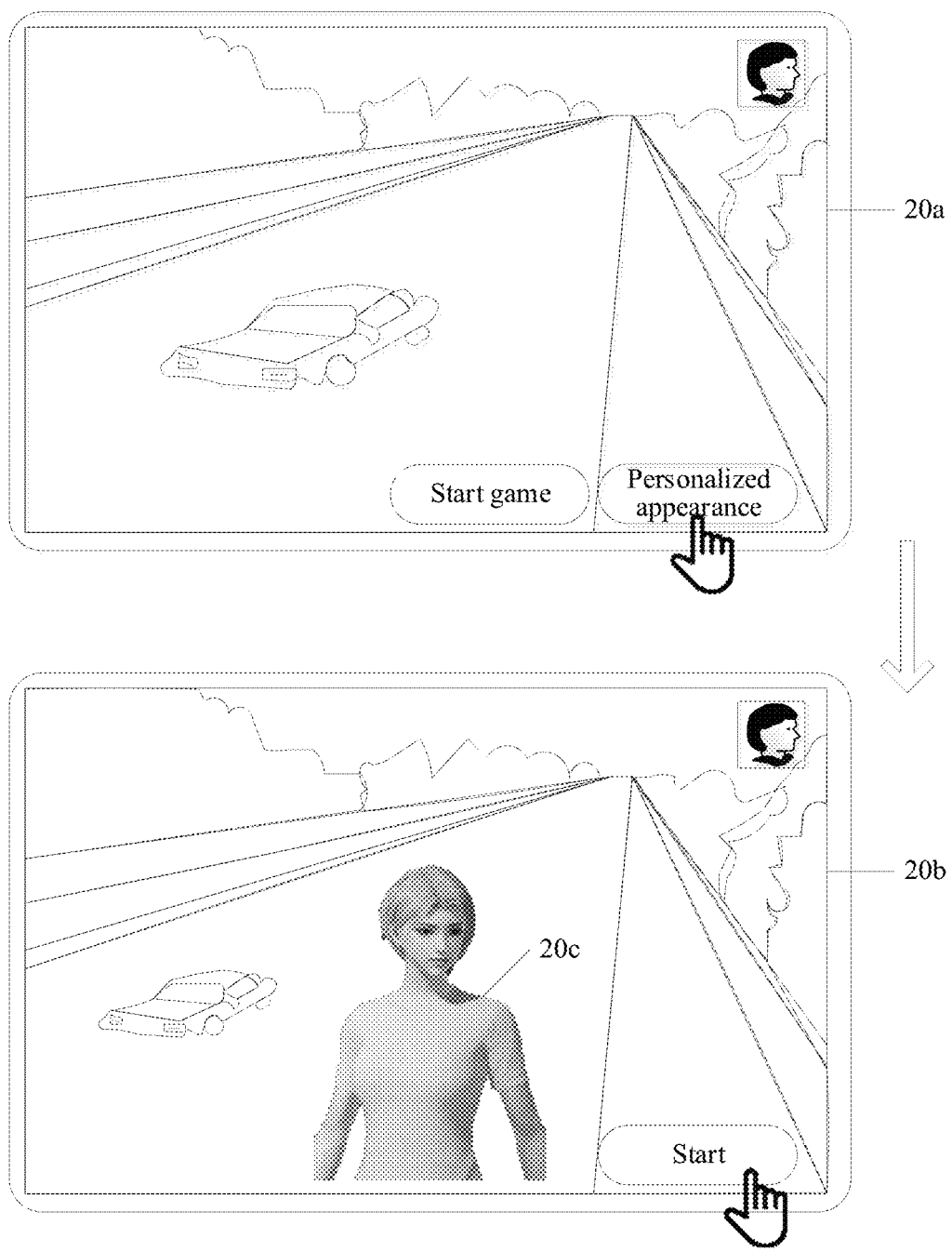
FIG. 2A to FIG. 2E are schematic scenario diagrams of image processing according to some embodiments.
Figure 2B:
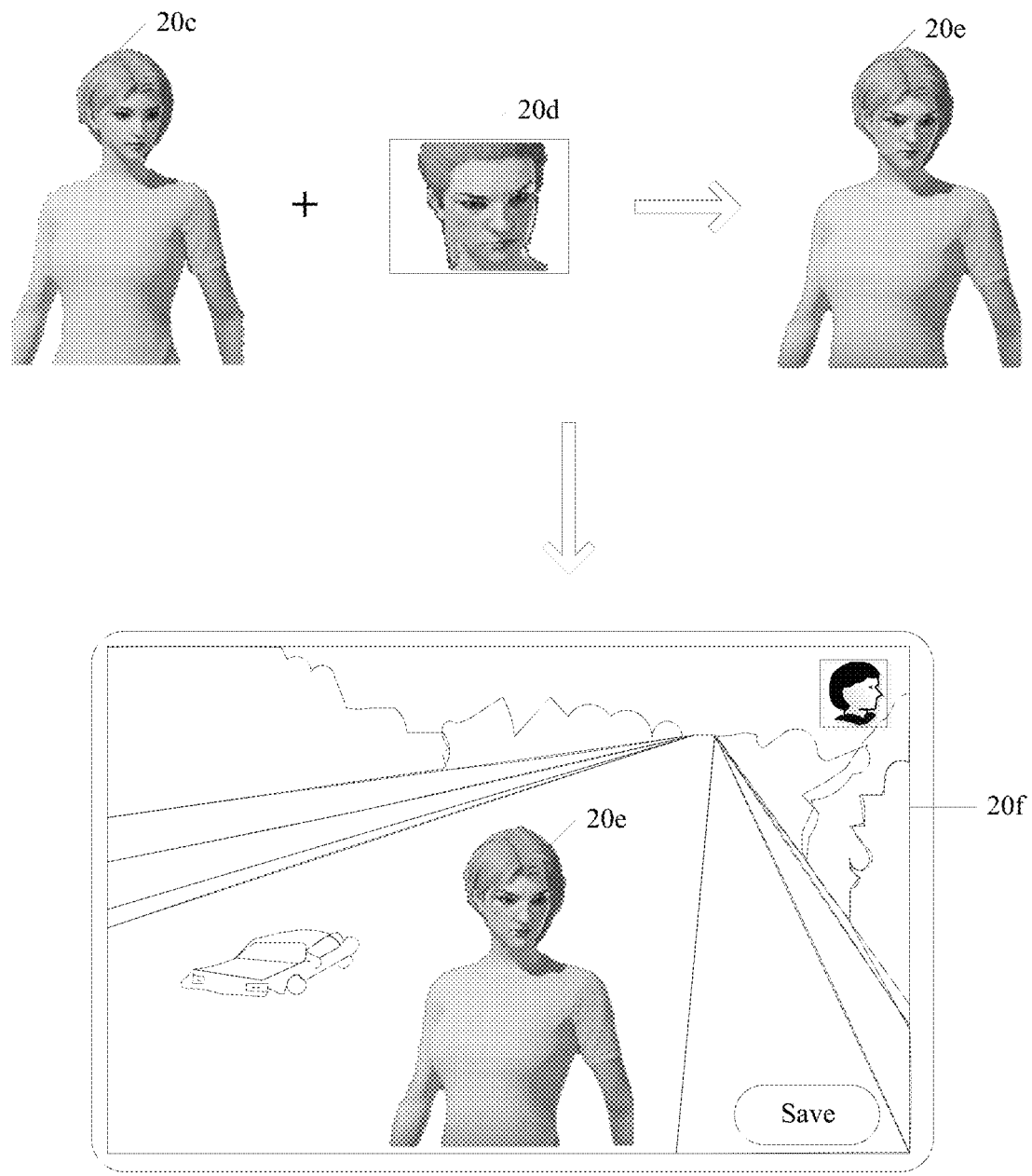

FIG. 2A to FIG. 2E are schematic scenario diagrams of image processing according to some embodiments. As shown in FIG. 2A, the terminal device 10a displays a page 20a. The page 20a includes a button "Personalized appearance" and a button "Start game". The button "Personalized figure" is used for customizing a personalized game role. A user may click/tap the button "Personalized figure", and the terminal device displays a page 20b. It may be seen from FIG. 2A that, the page 20b includes a button "Start" and a game role 20c, the game role 20c being a three-dimensional game role. The user may click/tap the button "Start", and the terminal device 10a turns on a camera to capture a face image of the user. As shown in FIG. 2B, the terminal device 10a captures a face image 20d, producing a three-dimensional image. Compared to a two-dimensional image, the three-dimensional image has additional image depth information. Due to the depth information, the three-dimensional image looks more three-dimensional than the two-dimensional image.

The terminal device 10a performs face fusion on the game role 20c and the captured face image 20d to obtain a new game role 20e. Face fusion may be detailed into map fusion and point cloud fusion.

Map fusion refers to performing point-to-point mapping on the face image 20d to a facial region of the game role 20c. A face shape of the new game role 20e obtained after the mapping is consistent with a face shape of the user (or a face shape of the face image 20d).

Point cloud fusion refers to fusing face feature points of the face image 20d with face feature points of the game role 20c, fusing a two-dimensional map of the face image 20d with a two-dimensional map of a face of the game role 20, combining the fused face feature points and the two-dimensional maps into a new face object of a game object, and combining the new face object, the rest (a body and a head) of the game object 20c, and the like into a new game object. A face shape of the new game object obtained by the point cloud fusion is similar to but not exactly the same as the face shape of the user. In other words, a face of the new game object has both the face features of the user and the face features of the game role 20c.

In this embodiment, the game role 20c and the face image 20d are fused into the new game role 20e by the map fusion. It may be seen from FIG. 2B that the face shape of the game role 20e is consistent with the face shape of the face image 20d. By comparing the game role 20c with the game role 20e, it may be learned that the rest (for example, a hairstyle and clothing) of the two game roles are the same except for their faces.

In addition to fusing the game role 20c and the face image 20d into the new game role 20e, the terminal device 10a further needs to determine a face rotation angle of the user according to the face image 20d. In an example embodiment, it may be assumed that the face rotation angle determined according to the face image 20d is: right, 10 degrees.

A process of determining the face rotation angle is as follows: the terminal device 10a acquires face feature point coordinates of the face image 20d, where the face feature point coordinates may include coordinates of eyes, coordinates of a nose tip, coordinates of a forehead, and the like, determines a coordinate difference between the face feature point coordinates of the face image 20d and face feature point coordinates of a standard face image, and determines the face rotation angle of the user according to the coordinate difference.

The order in which the terminal device 10a determines the face rotation angle first or fuses the game role 20c and the face image 20d into the new game role 20e is not defined. For example, the terminal device 10a may determine the face rotation angle first or may fuse the game role 20c and the face image 20d into the new game role 20e first.

As shown in FIG. 2B, after determining the game role 20e and the face rotation angle, the terminal device 10a displays the game role 20e on a page 20f according to the face rotation angle. Alternatively, the terminal device 10a determines a display angle according to the face rotation angle, and the terminal device 10a displays the game role 20e on the page 20f according to the display angle. A preset proportional relationship exists between the face rotation angle and the display angle. For example, if the preset ratio relationship is 1:2 and the face rotation angle is: right, 10 degrees, the display angle may be: right, 20 degrees. As shown in FIG. 2B, the display angle of the game role 20e on the page 20f matches a facial posture of the user.

Figure 2C:
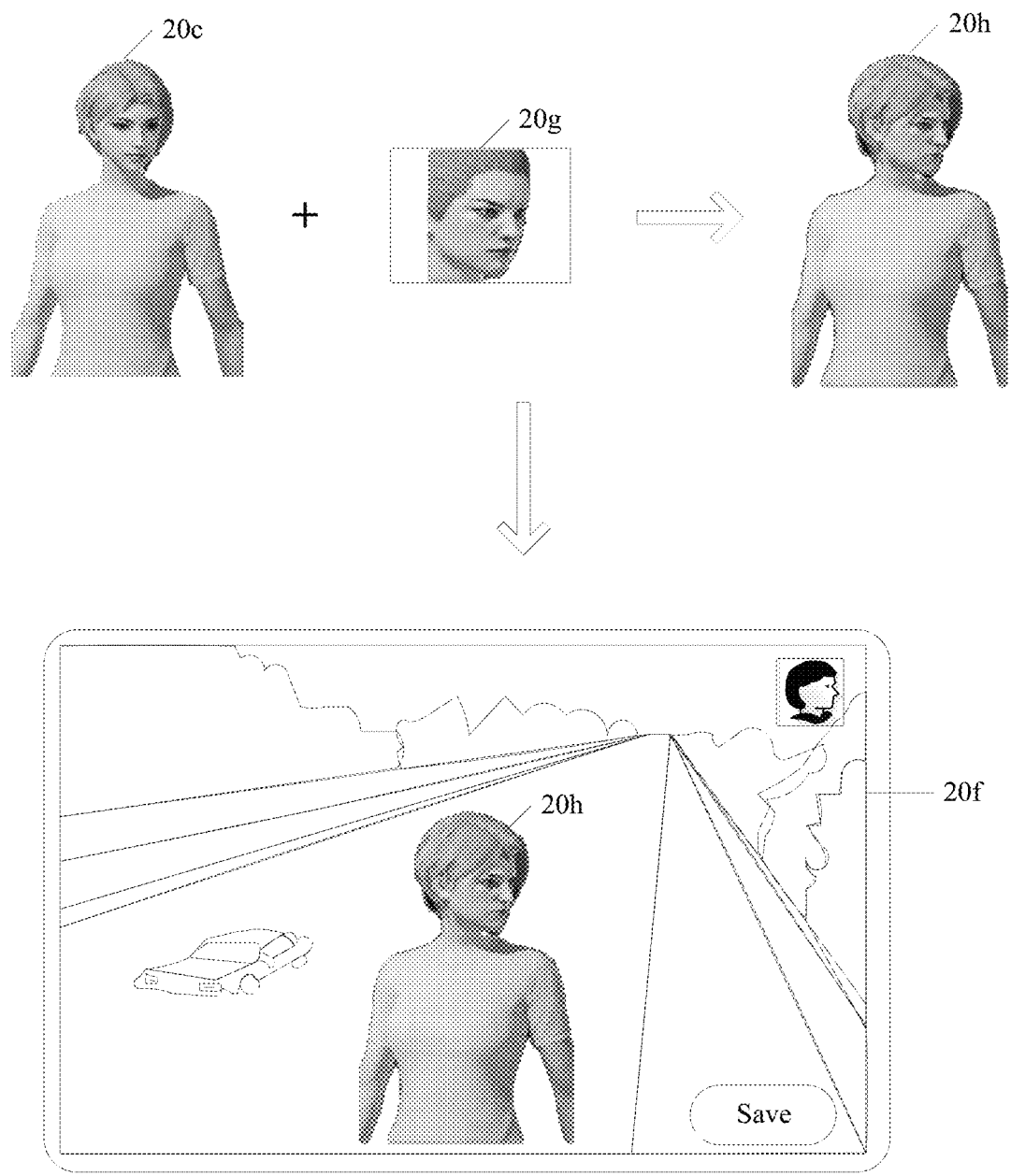

The process in which the terminal device 10a acquires the face image is described above. Additionally, the camera can continuously acquire a plurality of face images of the user. As shown in FIG. 2C, it is assumed that the terminal device 10a acquires a face image 20g after acquiring the face image 20d.

Similar to the above fusion process to obtain the game role 20e, the terminal device 10a performs face fusion on the game role 20c and the captured face image 20g to obtain a new game role 20h (shown in FIG. 2C).

It may be seen from FIG. 2C that a face shape of the game role 20h is consistent with a face shape of the face image 20g. By comparing the game role 20c with the game role 20h, it may be seen that the rest (for example, a hairstyle and clothing) of the two game roles are the same except for their faces.

Similar to the above determination of the face rotation angle of the face image 20d, the terminal device 10a determines a face rotation angle of the user according to the face image 20g. It is assumed that the face rotation angle determined according to the face image 20g is: right, 20 degrees.

As shown in FIG. 2C, after determining the game role 20h and the face rotation angle, the terminal device 10a displays the game role 20h on the page 20f according to the face rotation angle. Alternatively, the terminal device 10a determines a display angle according to the face rotation angle, and the terminal device 10a displays the game role 20h on the page 20f according to the display angle. A preset proportional relationship exists between the face rotation angle and the display angle. For example, if the preset ratio relationship is 1:2 and the face rotation angle is: right, 20 degrees, the display angle may be: right, 40 degrees. As shown in FIG. 2C, the display angle of the game role 20h on the page 20f matches a facial posture of the user.

Figure 2D:
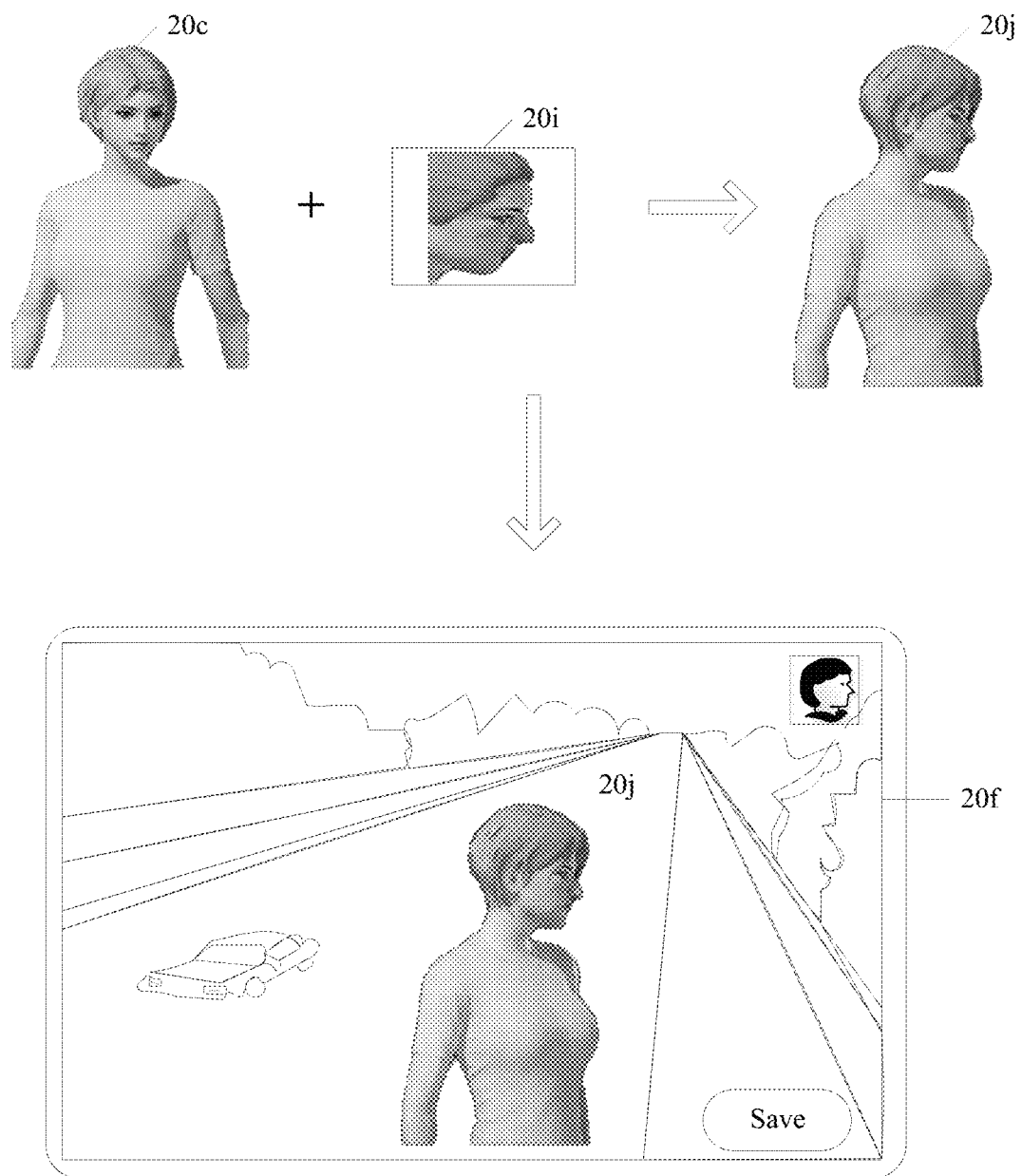

The camera may continue acquiring a plurality of face images of the user. As shown in FIG. 2D, it is assumed that the terminal device 10a acquires a face image 20i after acquiring the face image 20g.

Similar to the above fusion process to obtain the game role 20e, the terminal device 10a performs face fusion on the game role 20c and the captured face image 20i to obtain a new game role 20j (shown in FIG. 2D).

Similar to the above determination of the face rotation angle of the face image 20d, the terminal device 10a determines a face rotation angle of the user according to the face image 20i. In an example embodiment, it is assumed that the face rotation angle determined according to the face image 20i is: right, 30 degrees.

As shown in FIG. 2D, after determining the game role 20j and the face rotation angle, the terminal device 10a displays the game role 20j on the page 20f according to the face rotation angle. Alternatively, the terminal device 10a determines a display angle according to the face rotation angle, and the terminal device 10a displays the game role 20j on the page 20f according to the display angle. A preset proportional relationship exists between the face rotation angle and the display angle. For example, if the preset ratio relationship is 1:2 and the face rotation angle is: right, 30 degrees, the display angle may be: right, 60 degrees. As shown in FIG. 2D, the display angle of the game role 20j on the page 20f matches a facial posture of the user.

Figure 2E:
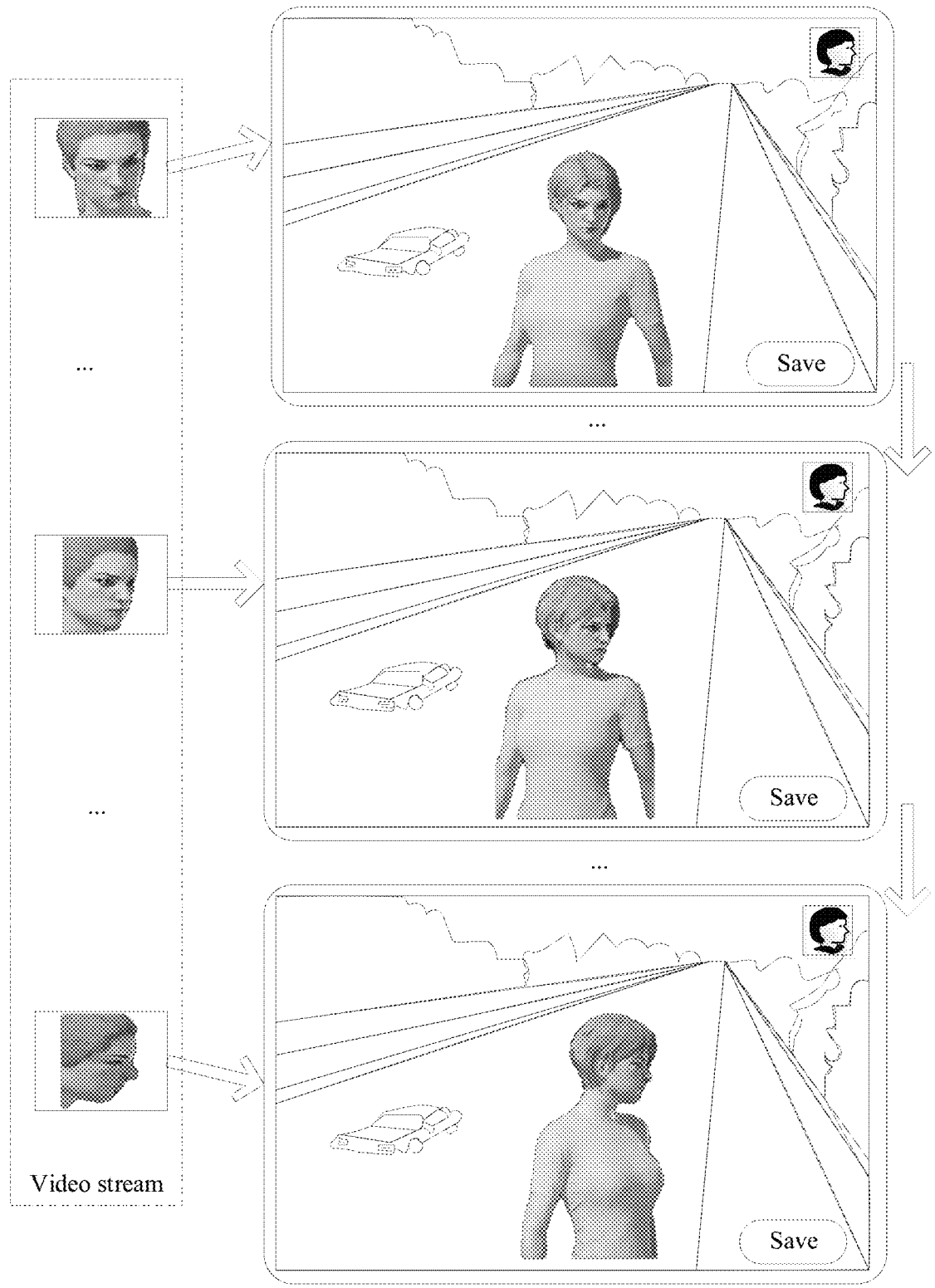

In conclusion, as shown in FIG. 2E, the camera continuously acquires the face image of the user. If the face of the user is rotating during the capture, the captured face image includes multi-directional face images. Each face image is fused with the game role 20c to obtain a fused game role, and a face rotation angle may be determined based on each face image. The fused game roles are displayed on the page in a plurality of directions according to the plurality of face rotation angles. In terms of senses of the user, as the face of the user continuously rotates, the game role on the page rotates, and the face shape of the game role on the page is consistent with the face shape of the user.

It may be learned from the above that, in some embodiments, a personalized game role can be customized. In addition, since the display angle of the personalized game role on the page is correlated with the facial posture of the user, real-time interaction between the game role and the user can be realized, and a display effect of the target role object on the page can be improved.

In this embodiment, for specific processes of displaying the original role object (such as the game role 20c in the above embodiment) on the first application page (such as the page 20b in the above embodiment) and displaying the target role object (such as the game role 20e, the game role 20h, and the game role 20j in the above embodiment) on the second application page (such as the page 20f in the above embodiment), refer to the following embodiments corresponding to FIG. 3 to FIG. 8.

Figure 3:
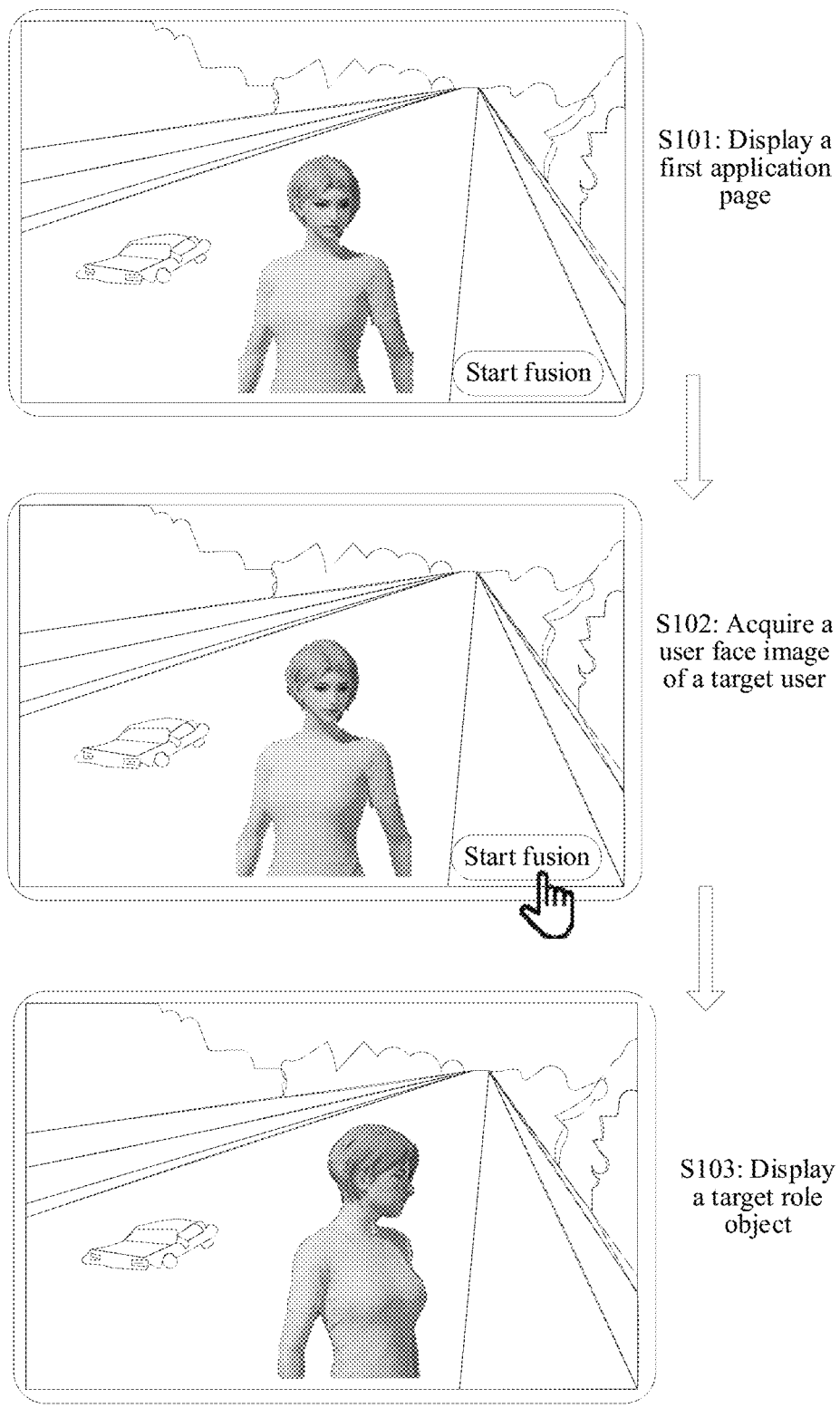
FIG. 3 is a schematic flowchart of an image processing method according to some embodiments.

FIG. 3 is a schematic flowchart of an image processing method according to an example embodiment. A front end may display a personalized role object using a terminal device as an execution subject and the image processing method may include the following operations S101-S103.

Operation S101: Display a first application page, the first application page including an original role object and a face fusion control.

In an example embodiment, the terminal device (such as the terminal device 10a in the above embodiment corresponding to FIG. 2A to FIG. 2E) displays a share page. The share page is sent by a target friend of a current user (referred to as a target user). The share page includes a personalized role object customized by the target friend and a prompt message: "Do you want to customize a role?" If the target user selects "Yes", the terminal device displays a first application page (such as the page 20a in the above embodiment corresponding to FIG. 2A to FIG. 2E) including the original role object (such as the game role 20c in the above embodiment corresponding to FIG. 2A to FIG. 2A) and the face fusion control (such as the button "Start" in the above embodiment corresponding to FIG. 2A to FIG. 2E), the original role object being a three-dimensional role object.

Operation S102: Acquire a user face image of a target user in a case that the face fusion control is triggered.

In an example embodiment, the target user may trigger the face fusion control. In response to the trigger operation performed by the target user, the terminal device starts a camera. The camera continuously acquires the user face image (such as the face image 20d, the face image 20g, and the face image 20i in the above embodiment corresponding to FIG. 2A to FIG. 2E) of the target user.

The plurality of user face images that are continuously acquired may alternatively be referred to as a user face video stream, and any user face image is a video frame of the user face video stream. Therefore, the user face image of the target user acquired in operation S102 is any video frame image in the user face video stream of the target user. A user face image in the user face video stream is used as an example for specific description below.

In an embodiment, any user face image in the face video stream is a three-dimensional image, and each pixel in the user face image includes not only a pixel value but also depth information. Due to the depth information, the three-dimensional image visually looks more three-dimensional than a two-dimensional image.

Operation S103: Display a target role object on a second application page, the target role object being obtained by fusing the user face image and the original role object, a display angle of the target role object matching posture information of the target user, and the posture information of the target user being determined according to the user face image.

The terminal device displays a second application page including the target role object (such as the game role 20e, the game role 20h, and the game role 20j in the above embodiment corresponding to FIG. 2A to FIG. 2E), and the target role object is obtained by fusing the user face image and the original role object. Since the target role object is obtained by fusing the user face image and the original role object, the target role object has the same face features as the user face image, or the target role object has the same face features as the target user.

The target role object is also a three-dimensional role object, and the display angle of the target role object on the second application page matches the posture information of the target user. The posture information herein may include facial posture information. The posture information of the target user is determined based on the user face image. The display angle may be a display angle of the whole target role object, or may be a display angle of a head of the target role object.

The display angle of the target role object is adjusted on the second application page in a case that the posture information of target user changes. For example, the facial posture information of the target user is: (right, 20°), the facial posture information indicates that the face of the target user is deflected rightward by 20°. In this case, the display angle of the target role object on the second application page may be: (right, 20°). The display angle may indicate that the target user sees a target role object wholly deflected rightward by 20° or a target role object with a head deflected rightward by 20° when the target role object is displayed on the second application page.

Since the camera continuously captures a plurality of user face images to form a user face video stream, each user face image in the user face video stream can be fused with the original role object to form a target role object, and a display angle can be determined for each target role object. The target role object is displayed on the second application page according to the corresponding display angle. A face of each target role object is slightly different due to a different user face image. Therefore, when the posture information of the target user changes, that is, when the plurality of captured user face images are multi-directional images of the face of the target user, the display angle of the target role object on the second application page is adjusted correspondingly. In general, a current display angle of the target role object matches posture information determined based on a currently acquired user face image.

Visually, during the capture of the user face video stream, the target user may turn the head leftward or rightward. The target role object on the second application page rotates with the rotation of the head of the target user.

In an example embodiment, the second application page further includes a share control which may be triggered by the target user. The terminal device displays a user list including a plurality of to-be-shared user options in a case that the share control is triggered. The target user may select a target to-be-shared user option from the plurality of to-be-shared user options. The terminal device transmits the second application page including the target role object to a terminal device corresponding to the target to-be-shared user option in a case that the target to-be-shared user option is triggered to share the customized and personalized role object with a friend.

In an example embodiment, the second application page includes a save control.

When the user triggers the save control, the terminal device turns off the camera and stores the target role object on the second application page. Subsequently, the target user may control the target role object for game entertainment and the like.

The user may alternatively hold and press a page region in the second application page where the target role object is located, so that the terminal device generates a role image including the target role object as image content, and saves the role image to an album file.

The customization function may be an additional function after the user purchases game props. That is to say, after purchasing the game props, the user has permission to customize a personalized role object. In this way, purchases of game props are increased. A specific process is as follows:

The terminal device displays a prop display page including a plurality of game props. For example, a "mall" page in a game may correspond to the prop display page. The target user may purchase a target game prop from the plurality of game props. In response to the transaction for the target game prop, the terminal device displays the first application page, and the original role object on the first application page carries the target game prop. The target role object in the subsequent second application page also carries the target game prop. The target game prop is any one of the plurality of game props displayed on the prop display page. In this way, when the target role object is displayed on the second application page from a plurality of display angles, the target game prop is displayed to the user in a plurality of directions.

For example, if the target game prop is a shirt, the original role object on the first application page wears the shirt, and the target role object on the second application page also wears the shirt. If the target game prop is a decoration, the original role object on the first application page wears the decoration, and the target role object on the second application page also wears the decoration.

By optimizing simulation experience of role object props in the game, user's desire to purchase the game props can be improved, and interactive experience of the game can be enhanced.

After purchase of the game props, a personalized role object may be customized. The terminal device may detect a number of game props corresponding to the original role object. After it is detected that the number of game props owned by the original role object reaches a set number, the target user may be granted the permission to customize the personalized role object. A specific process is as follows:

The first application page is a display page of the game props purchased by the target user. For example, a "warehouse" page or a "personal item" page in the game may correspond to the first application page. If the terminal device detects that the number of game props corresponding to the original role object is greater than a preset number threshold (the number threshold herein may be 1), the terminal device sets the face fusion control on the first application page to an active state. When the face fusion control is triggered and the face fusion control is in the active state, the terminal device starts the camera to capture a plurality of user face images of the target user to form a user face video stream. Then each user face image in the user face video stream is fused with the original role object to form a target role object. A display angle is determined for each target role object, and the target role object is displayed according to the display angle.

Further, the customized personalized role object may be shared with friends by triggering the share control, which can improve efficiency of information sharing and enrich types of shared information. By optimizing simulation experience of role object props in the game, a possibility that the user purchases the game props can be improved, and interactive experience of the game can be enhanced.

Figure 4:
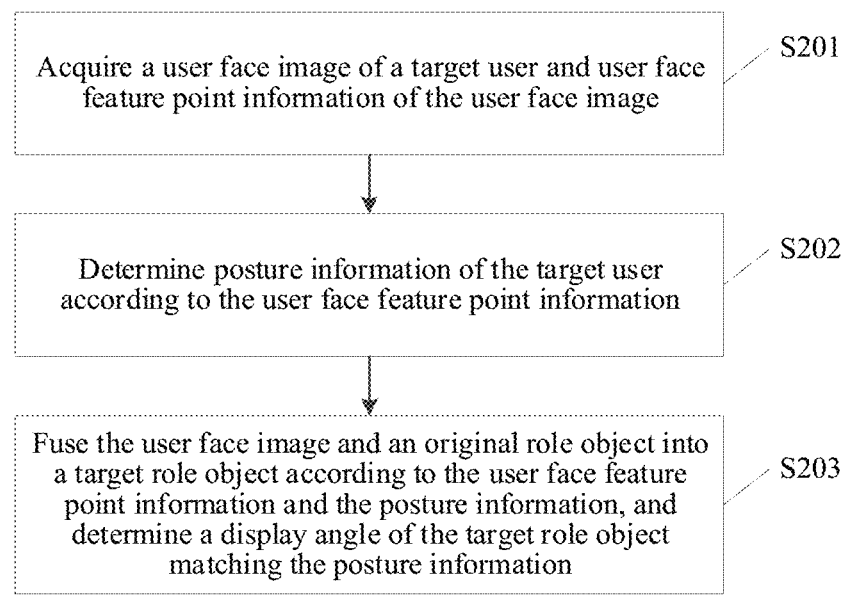
FIG. 4 is a schematic flowchart of another image processing method according to some embodiments.

FIG. 4 is a schematic flowchart of another image processing method according to an embodiment of this application. Customization a personalized role object is described in the following embodiment by using a server as an execution subject. The image processing method may include the following operation S201-S203.

Operation S201: Acquire a user face image of a target user and user face feature point information of the user face image.

In an example embodiment, the server acquires an original face image of the target user. For example, the server receives an original face video stream of a current user (referred to as the target user) sent by the terminal device. Any video frame image in the original face video stream is referred to as the original face image. The original face image is a three-dimensional image. The server performs face feature point recognition on each original face image, and determines N unit feature point coordinates, where N is a positive integer. Each of the unit feature point coordinates is three-dimensional coordinates. For example, first unit feature point coordinates of the N unit feature point coordinates represent coordinates of an eyebrow peak, second unit feature point coordinates represent coordinates of a tail of an eyebrow, . . . , and $N^{th}$ unit feature point coordinates represent coordinates of a lip corner, and so on.

The server extracts an image corresponding to the N unit feature point coordinates from the original face images, and uses the extracted image as the user face image and the N unit feature point coordinates as the user face feature point information. The user face image is a three-dimensional image, and the user face feature point information of the user face image includes the N unit feature point coordinates. Since the user face image is an image corresponding to face feature points, image content of the user face image includes only contents on a face, and ears, hair, and the like are not included in the user face image.

Figure 5:
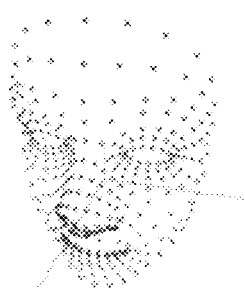
FIG. 5 is a schematic diagram of user face feature point information according to some embodiments.

FIG. 5 is a schematic diagram of user face feature point information according to an embodiment. The user face feature point information in FIG. 5 includes a plurality of unit feature point coordinates, and the unit feature point coordinates represent coordinates of face feature points.

The remaining original face images may be processed in the same way to obtain a plurality of user face images, and user face feature point information of each user face image of determined. The plurality of user face images may be referred to as a user face video stream. A user face image in the user face video stream is still used as an example for description below.

Operation S202: Determine posture information of the target user according to the user face feature point information.

In an example embodiment, the server acquires historical user face feature point information of the target user. The historical user face feature point information may be considered as user face feature point information of a user face image in the user face video stream at a previous moment. If the historical user face feature point information is different from user face feature point information of a current user face image, the server performs the operation of determining the posture information of the target user according to the user face feature point information, and uses the user face feature point information as new historical user face feature point information. Specifically, the server acquires N standard unit feature point coordinates. The standard unit feature point coordinates are a mean value of feature point coordinates of a plurality of standard face images. The plurality of standard face images are a plurality of face images captured when a plurality of faces are looking straight ahead. The server calculates a coordinate error between the N standard unit feature point coordinates and the N unit feature point coordinates, determines a rotation angle of the current user face image according to the coordinate error, and uses the determined rotation angle as the current posture information of the target user. The posture information may include facial posture information, such as the rotation angle.

After determining the posture information of the face of the target user, the server uses the user face feature point information of the current user face image as the new historical user face feature point information.

In an embodiment, if the historical user face feature point information is the same as the user face feature point information of the current user face image, the server may not process the current user face feature point information.

The reason is, the user face image is any video frame image in the user face video stream. If the historical user face feature point information is the same as the current user face feature point information, it indicates that the posture information of the target user does not change. Therefore, in order to save system resources, even if a user face image is captured, neither new posture information nor a new target role object is required to be determined, and the target role object at the previous moment is displayed on the terminal device side at the display angle at the previous moment. In other words, since the posture information does not change, neither the target role object nor the display angle of the target role object in the terminal device changes.

In an embodiment, in addition to indirectly determining whether the posture information of the target user changes by detecting the face feature point information, the server may alternatively directly determine whether the posture information of the target user changes by comparison. For example, if the posture information of the current user face image is different from the historical posture information, the server may perform the following operation S203. If the posture information of the current user face image is the same as the historical posture information, the server may not perform the following operation S203, and the target role object at the previous moment is displayed on the terminal device side at the display angle at the previous moment.

Operation S203: Fuse the user face image and an original role object into a target role object according to the user face feature point information and the posture information, and determine a display angle of the target role object matching the posture information.

In an example embodiment, the server detects whether a historical target role object exists in a role object cache space. If no historical target role object exists, the user face image and the original role object are fused into the target role object according to the current user face feature point information and posture information, and the display angle of the target role object matching the posture information is determined. Subsequently, the server caches the newly generated target role object into the role object cache space as the historical target role object, and caches the user face image into an image storage space as a historical user face image.

If no historical target role object exists in the role object cache space, the server further detects whether a difference between a historical user face image of the historical target role object and the current user face image is less than a difference threshold. If the difference is less than the difference threshold, it indicates that only a small difference exists between the currently captured user face image and the user face image captured at the previous moment. Therefore, the server may directly read the historical target role object from the role object cache space as the target role object, and then the server determines the display angle of the target role object matching the posture information. In this case, the server may not fuse the user face image with the original role object, and only needs to determine the display angle of the target role object. Subsequently, the server caches the user face image into the image storage space as the historical user face image.

If a historical target role object exists in the role object cache space, and a difference between a historical user face image of the historical target role object and the current user face image is not less than the difference threshold, it indicates that a large difference exists between the currently captured user face image and the user face image captured at the previous moment. The server fuses the user face image and the original role object into the target role object according to the current user face feature point information and the posture information, and determines the display angle of the target role object matching the posture information. Subsequently, the server caches the newly generated target role object into the role object cache space as a new historical target role object (in the case, only a latest historical target role object is stored in the role object cache space), and caches the user face image into the image storage space as the historical user face image.

Whether the server performs fusion to obtain the target role object first or determines the display angle first is not defined. The determination process in operation S203 may alternatively be performed by the terminal device. For example, the role object cache space is a storage space in the terminal device, and the terminal device determines to directly read the target role object from the role object cache space or request the server to generate a new target role object. If the terminal device determines to directly read the target role object from the role object cache space, the terminal device only needs to request the display angle of the target role object from the server. If the terminal device determines that a new target role object is required to be generated and a display angle is required to be determined, the terminal device needs to request the server for the target role object and the display angle of the target role object.

A specific process in which the server determines the display angle of the target role object may be as follows:

The server may directly use the rotation angle included in the posture information as the display angle, or determine the display angle according to a preset proportional relationship between the rotation angle and the display angle and the rotation angle. The display angle may be specifically a display angle of the whole target role object, or may be a display angle of a head of the target role object. Directly using the rotation angle as the display angle may alternatively be understood as a preset ratio of 1:1. For example, if the rotation angle is: (right, 5°), the display angle may be: (right, 5°). Alternatively, if the preset ratio is 1:2 and the rotation angle is: (right, 5°), the display angle may be: (right, 10°).

A process of fusing the user face image and the original role object into the target role object according to the current user face feature point information and the posture information is described below in detail.

The server acquires role face feature point information of the original role object. The role face feature point information includes N unit role feature point coordinates, and the N unit role feature point coordinates are in a one-to-one correspondence with the N unit feature point coordinates of the user face image. The server scales the user face image according to a ratio between the role face feature point information and the user face feature point information to obtain an auxiliary face image. The auxiliary face image is a scaled face image. Correspondingly, the user face feature point information is scaled to obtain scaled user face feature point information, which is referred to as auxiliary face feature point information. A face size represented by the auxiliary face image approximates to a face size of the original role object. The auxiliary face image is also a three-dimensional image.

For example, it is determined according to the role face feature point information that a distance between eyes of the original role object is 2 and a distance between a center between eyebrows and a tip of a nose is 4. It is determined according to the user face feature point information that a distance between eyes is 6 and a distance between a center between eyebrows and a tip of a nose is 12.2. In this case, the user face image may be scaled down 3 times, so that the distance between the eyes of the scaled face image (that is, the auxiliary face image) is 2, and the distance between the eyebrows and the tip of the nose is 4.06.

Subsequently, the server may fuse the auxiliary face image and the original role object into the target role object according to the rotation angle. The server may fuse the auxiliary face image and the original role object into the target role object by map fusion, or may fuse the auxiliary face image and the original role object into the target role object by point cloud fusion.

In this embodiment, a process in which the server fuse the auxiliary face image and the original role object into the target role object according to the rotation angle includes: acquiring the auxiliary face feature point information of the auxiliary face image; and aligning and mapping the original role object and the auxiliary face image according to the role face feature point information, the auxiliary face feature point information, and the rotation angle, to obtain the target role object. The face shape of the target role object is consistent with the face shape of the target user.

A specific process of the map fusion is described below:

The original role object includes an original role head object and an original role body object. The original role head object includes an original role face object and an original role non-face object. Since this example embodiment involves only fusion of faces but no other body parts, a to-be-processed object is the original role face object, for example.

The server aligns the original role object and the auxiliary face image according to the posture information (for example, the rotation angle). The original role object may be aligned toward the auxiliary face image, or the auxiliary face image may be aligned toward the original role object.

If the original role object is aligned toward the auxiliary face image, the server needs to adjust the role face feature point information of the original role object. The adjusted role face feature point information is referred to as first face feature point information. The original role face object is obtained by fusing the first face feature point information and multi-angle model maps. The server replaces the first face feature point information of the original role face object with the auxiliary face feature point information, replaces the model map of the original role face object corresponding to the rotation angle with a two-dimensional user map, and fuses the auxiliary face feature point information, the two-dimensional user map, and the remaining model maps that are not replaced into a target role face object. The two-dimensional user map is converted from a three-dimensional auxiliary face image. The server splices the target role face object, the original role non-face object, and the original role body object into the target role object.

If the auxiliary face image is aligned toward the original role object, the server needs to adjust the auxiliary face feature point information of the auxiliary face image. The adjusted auxiliary face feature point information is referred to as second face feature point information. The original role face object is obtained by fusing the role face feature point information and multi-angle model maps. The server replaces the role face feature point information of the original role face object with the second face feature point information, replaces the model map of the original role face object corresponding to the rotation angle with a two-dimensional user map, and fuses the second face feature point information, the two-dimensional user map, and the remaining model maps that are not replaced into a target role face object. The two-dimensional user map is converted from a three-dimensional auxiliary face image. The server splices the target role face object, the original role non-face object, and the original role body object into the target role object.

A face shape of the target role object determined by the map fusion is consistent with the face shape of the target user. In other words, the face shape of the target role object determined by the map fusion is consistent with the face shape of the user face image.

In this embodiment, the process in which the server fuse the auxiliary face image and the original role object into the target role object according to the rotation angle includes: acquiring a fusion ratio factor; aligning and fusing the original role face object and the auxiliary face image into the target role face object according to the fusion ratio factor and the rotation angle; and splicing the target role face object, the original role non-face object, and the original role body object into the target role object. A difference between the face shape of the target role object and the face shape of the target user is determined based on the fusion ratio factor.

A specific process of the point cloud fusion is described below:

The original role object includes an original role head object and an original role body object. The original role head object includes an original role face object and an original role non-face object. Since this example embodiment involves only fusion of faces but no other body parts, a to-be-processed object is the original role face object, for example.

The server aligns the original role object and the auxiliary face image according to the posture information (for example, the rotation angle). The original role object may be aligned toward the auxiliary face image, or the auxiliary face image may be aligned toward the original role object.

If the original role object is aligned toward the auxiliary face image, the server needs to adjust the role face feature point information of the original role object. The adjusted role face feature point information is referred to as first face feature point information. The server acquires the fusion ratio factor (for example, the fusion ratio factor is 1:1, which indicates that the face of the original role object and the face of the target user are to be fused at the ratio of 1:1, so that a generated face of the target role object is similar to both the face of the original role object and the face of the target user, and similarities of the generated face with the face of the original role object and the face of the target user are respectively 50%). The original role face object is obtained by fusing the role face feature point information and multi-angle model maps. The server performs coordinate fusion on the first face feature point information of the original role face object and the auxiliary face feature point information according to the fusion ratio factor, to obtain fused face feature point information. The server fuses the model map of the original role face object corresponding to the rotation angle with the two-dimensional map according to the fusion ratio factor to obtain a fused map, and fuses the fused face feature point information, the fused map, and the remaining model maps that are not replaced into a target role face object. The two-dimensional user map is converted from a three-dimensional auxiliary face image. The server splices the target role face object, the original role non-face object, and the original role body object into the target role object.

If the auxiliary face image is aligned toward the original role object, the server needs to adjust the auxiliary face feature point information of the auxiliary face image. The adjusted auxiliary face feature point information is referred to as second face feature point information. The server acquires a fusion ratio factor. The original role face object is obtained by fusing the role face feature point information and multi-angle model maps. The server performs coordinate fusion on the role face feature point information of the original role face object and the second face feature point information according to the fusion ratio factor, to obtain fused face feature point information. The server fuses the model map of the original role face object corresponding to the rotation angle with the two-dimensional map according to the fusion ratio factor, to obtain a fused map, and fuses the fused face feature point information, the fused map, and the remaining model maps that are not replaced into a target role face object. The two-dimensional user map is converted from a three-dimensional auxiliary face image. The server splices the target role face object, the original role non-face object, and the original role body object into the target role object.

A difference between the face shape of the target role object determined by the point cloud fusion and the face shape of the target user is determined based on the fusion ratio factor.

If the fusion ratio of the original role object to the user face image is 2:3, the difference between the face shape of the target role object obtained by fusion and the face shape of the target user is $2/5=0.4$. In other words, a similarity between the face shape of the target role object obtained by fusion and the face shape of the target user is 0.6.

This embodiment is described by using the server as the execution body. In other embodiments, the above operation S201 to operation S203 may alternatively be performed by the terminal device.

The server generates a new target role object and determines a display angle only when the historical user face feature point information is different from the current user face feature point information. Therefore, system resources can be saved. Moreover, if the historical target role object has been stored in the cache space, and the difference between the historical user face image and the current user face image is relatively small, the historical role object may be directly read from the cache space as the target role object without a need to perform fusion, thereby reducing a load of the server.

Figure 6:
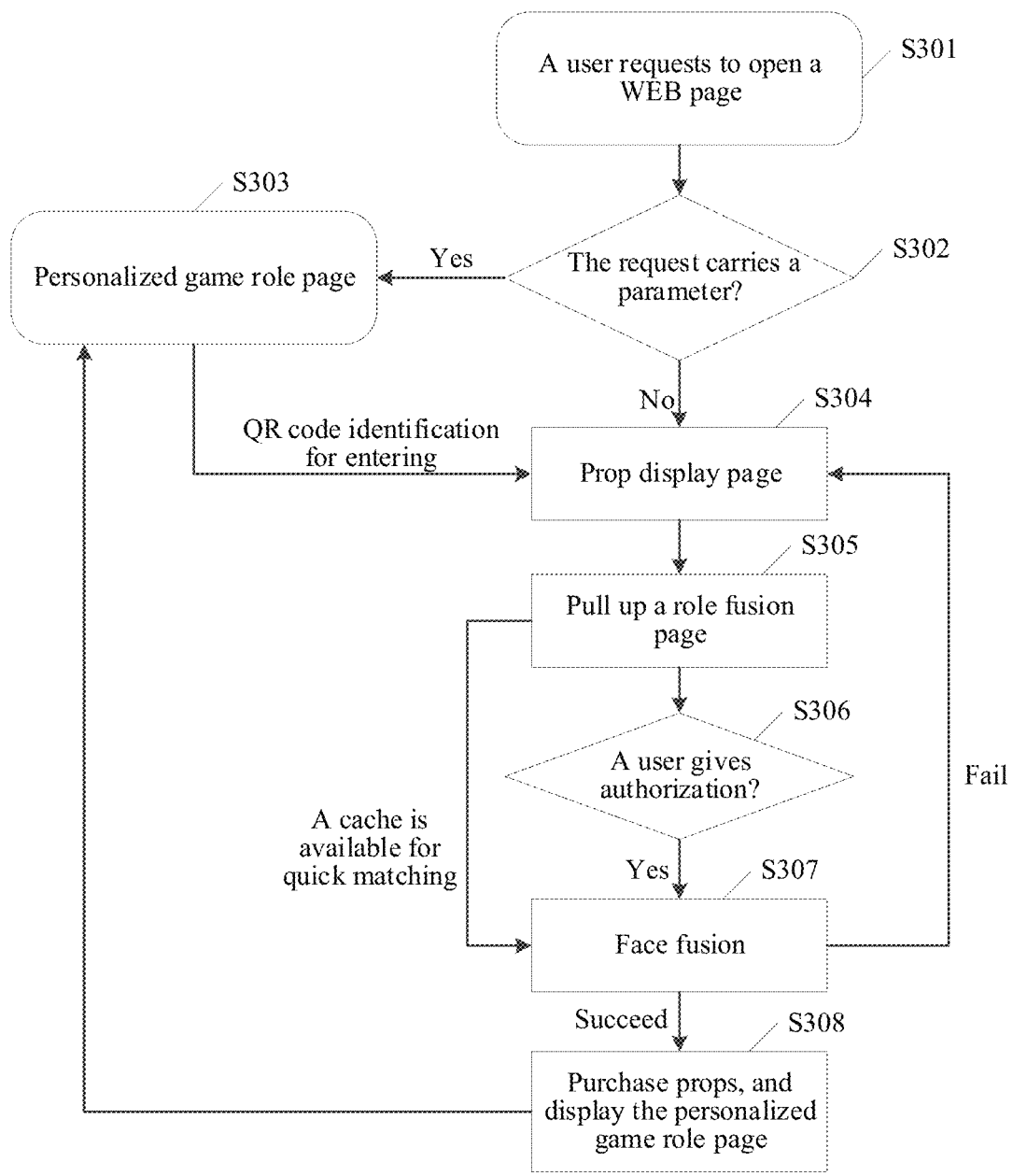
FIG. 6 is a schematic flowchart of another image processing method according to some embodiments.

FIG. 6 is a schematic flowchart of image processing method according to an example embodiment. This embodiment combines image processing with game props, and includes the following operations:

Operation S301: A user requests to open a WEB page.

For example, a terminal device generates a user request, and the user request is used for requesting to open a WEB page.

Operation S302: Detect whether the user request carries a parameter of a personalized game role, if so, perform operation S303, and if not, perform operation S304.

Operation S303: Display a personalized game role page.

If the user request carries the parameter of the personalized game role, it indicates that the page requested by the user is shared by a friend of the user. The terminal device displays the personalized game role page. The page includes a personalized game role customized by the friend of the user and game props purchased for the personalized game role customized by the friend of the user.

The personalized game role page further includes a prompt message and a QR code image. The prompt message is used for asking the user whether to enter a game role customization process. If the user scans the QR code, operation S304 is performed.

Operation S304: Display a prop display page.

Figure 7:
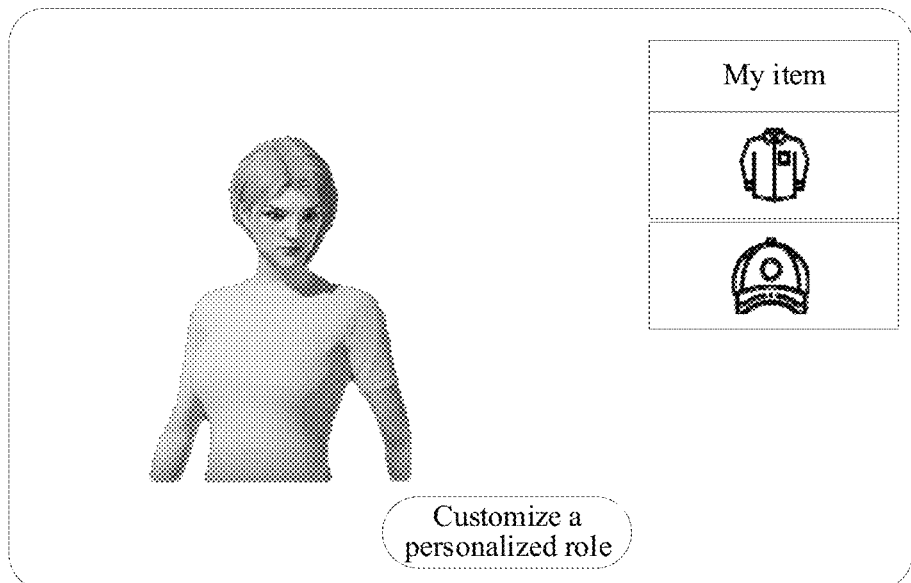
FIG. 7 is a schematic diagram of a prop display page according to some embodiments.

In an example embodiment, the terminal device displays the prop display page. FIG. 7 shows the prop display page. The prop display page includes a button "Customize personalized game role", an original game role, and game props purchased by the user. It may be seen from FIG. 7 that, for example, the user has purchased a top and a hat.

The prop display page may correspond to the first application page in some embodiments.

Operation S305: Pull up a role fusion page.

If the user triggers the button "Customize a personalized role", the role fusion page is displayed. A notification message is displayed on the page asking the user whether to authorize to start a camera, and a user face image of the user is captured.

Operation S306. If the user authorizes to capture a user face image, turn on a camera.

Operation S307: Fuse an original game role with the user face image.

The camera continuously captures the user face image, fuses the captured user face image and the original game role into a target game role, and determines a display angle of the target game role. During the fusion, the terminal device caches a latest target game role obtained by fusion to reduce fusions (in a case that the fusion is performed by the terminal device) or reduce interactions between the terminal device and a server (in a case that the fusion is performed by the server).

The target role object obtained by the fusion is displayed on the role fusion page according to the determined display angle. The camera may capture user face images in different directions. Correspondingly, a plurality of target game roles and a plurality of display angles are generated. The target game roles are displayed according to the plurality of display angles. From a perspective of the user, a face of the user is rotating, and correspondingly, the target game role is rotating.

The user may save the customized target game role.

If the fusion fails, operation S304 is performed.

Operation S308: After the user purchases props, generate the personalized game role page.

Figure 8:
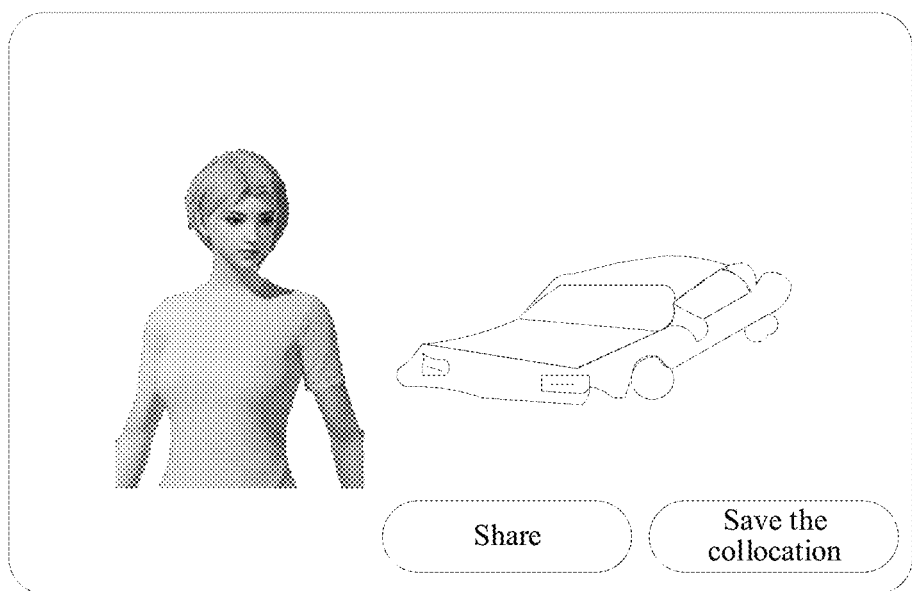
FIG. 8 is a schematic diagram of a personalized game role page according to some embodiments.

After the user purchases a target prop, the personalized game role page is displayed. FIG. 8 shows the personalized game role page of an example embodiment. The personalized game role page includes the target game role obtained by the fusion, the target prop purchased by the user (for example, a car is FIG. 8), and a button "Share".

If the user triggers the button "Share", a friend list is displayed. The user may select a friend for sharing from the friend list, and send the personalized game role page to the friend selected by the user for sharing.

The share function provided in this embodiment helps the friend of the user learn a page effect after the personalized game role carries the prop, thereby improving a possibility that other users purchase target props and enhancing interactive experience of the game.

If the user holds and presses the personalized game role page, the user can take a screenshot of the personalized game role page and save the screenshot to an album file.

The personalized game role page may further include a button "Save the collocation". If the user triggers the button, the target game role and the target prop are associated and stored.

Figure 9:
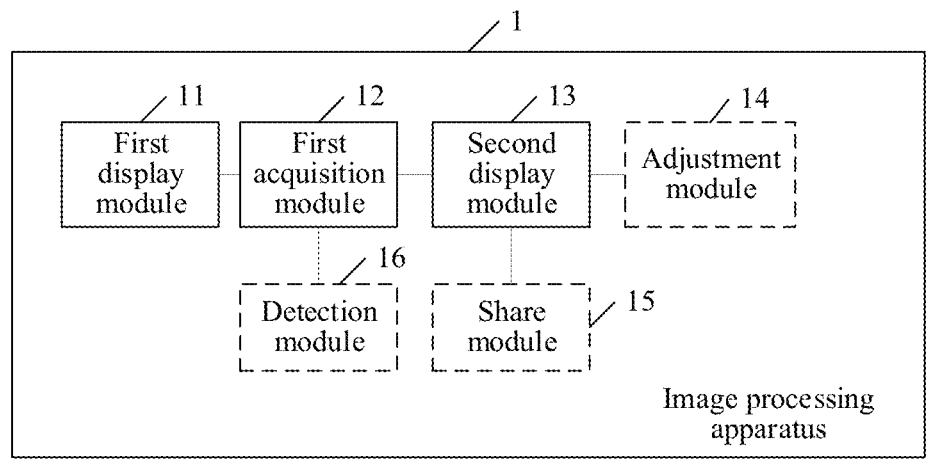
FIG. 9 is a schematic structural diagram of an image processing apparatus according to some embodiments.

Further, FIG. 9 is a schematic structural diagram of an image processing apparatus according to an embodiment of the disclosure. As shown in FIG. 9, the image processing apparatus 1 is applicable to the terminal device in the above embodiment corresponding to FIG. 3 to FIG. 8. The image processing apparatus 1 may be implemented as one or more hardware components in a computer device, or may be a computer program (including program code) running in the computer device. For example, the image processing apparatus is application software. The apparatus may be configured to perform corresponding operations in the methods provided in this embodiment.

The image processing apparatus 1 may include a first display module 11, a first acquisition module 12, and a second display module 13.

The first display module 11 is configured to display a first application page, the first application page including an original role object and a face fusion control.

The first acquisition module 12 is configured to acquire a user face image of a target user in a case that the face fusion control is triggered.

The second display module 13 is configured to display a target role object on a second application page, the target role object being obtained by fusing the user face image and the original role object, a display angle of the target role object matching posture information of the target user, and the posture information of the target user being determined according to the user face image.

In an example embodiment, the first acquisition module 11 is configured to:

display a prop display page including a plurality of game props;

display the first application page in response to a transaction for a target game prop, the original role object on the first application page carrying the target game prop, the target role object on the second application page carrying the target game prop, and the target game object being any one of the plurality of game props.

In an example, the user face image may be any video frame image in a user face video stream of the target user.

The image processing apparatus 1 may further include an adjustment module 14.

The adjustment module 14 is configured to adjust the display angle of the target role object on the second application page in a case that the posture information of the target user changes.

In an example embodiment, the second application page further includes a share control.

The image processing apparatus 1 may further include a share module 15.

The share module 15 is configured to display a user list including a plurality of to-be-shared user options in a case that the share control is triggered; and transmit the second application page including the target role object to a terminal device corresponding to a target to-be-shared user option in a case that the target to-be-shared user option is triggered, the target to-be-shared user option being any one of the plurality of to-be-shared user options.

In an example embodiment, the image processing apparatus 1 may further include a detection module 16.

The detection module 16 is configured to detect a number of game props corresponding to the original role object, and set the face fusion control on the first application page to an active state in a case that the number of game props is greater than a preset number threshold.

The first acquisition module 12 is configured to capture the user face image of the target user in a case that the face fusion control is triggered and the face fusion control is in the active state.

For implementations of the specific functions of the first display module 11, the first acquisition module 12, the second display module 13, the adjustment module 14, the share module 15, and the detection module 16, refer to operation S101 to operation S103 in the above embodiment corresponding to FIG. 3. Details are not described herein.

Figure 10:
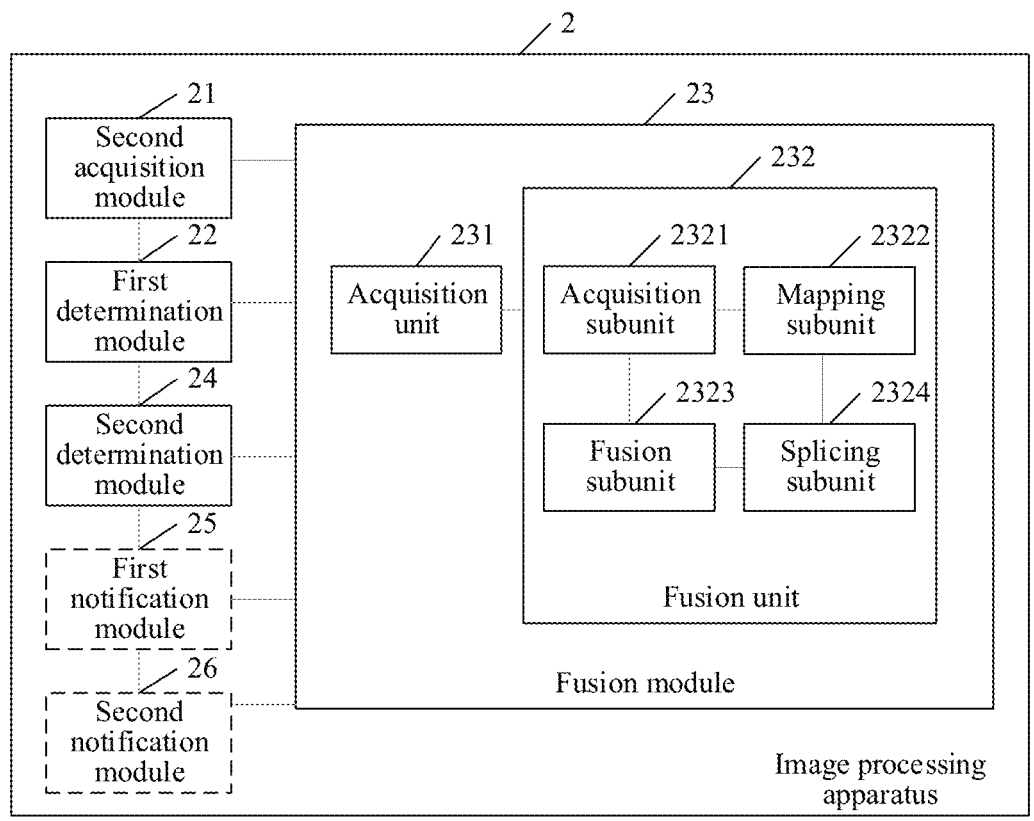
FIG. 10 is a schematic structural diagram of another image processing apparatus according to some embodiments.

Further, FIG. 10 is a schematic structural diagram of another image processing apparatus according to an embodiment of the disclosure. As shown in FIG. 10, the image processing apparatus 2 is applicable to the server in the above embodiment corresponding to FIG. 3 to FIG. 8. The image processing apparatus 2 may be implemented as one or more hardware components in a computer device, or may be a computer program (including program code) running in the computer device. For example, the image processing apparatus is application software. The apparatus may be configured to perform corresponding operations in the methods provided in this embodiment.

The image processing apparatus 2 may include a second acquisition module 21, a first determination module 22, a fusion module 23, and a second determination module 24.

The second acquisition module 21 is configured to acquire a user face image of a target user and user face feature point information of the user face image.

The first determination module 22 is configured to determine posture information of the target user according to the user face feature point information.

The fusion module 23 is configured to fuse the user face image and an original role object into a target role object according to the user face feature point information and the posture information.

The second determination module 24 is configured to determine a display angle of the target role object matching the posture information.

In an example embodiment, the user face image is a three-dimensional image, and the user face feature point information includes N unit feature point coordinates, N being a positive integer.

The second acquisition module 21 is configured to:

acquire original face images of the target user, the original face images being three-dimensional images;

perform face feature point recognition on the original face images to determine the N unit feature point coordinates, each of the unit feature point coordinates being three-dimensional coordinates;

extract an image corresponding to the N unit feature point coordinates from the original face images, and use the extracted image as the user face image.

In an example embodiment, the first determination module 22 is configured to:

acquire N standard unit feature point coordinates;

determine a coordinate error between the N standard unit feature point coordinates and the N unit feature point coordinates; and determine a rotation angle of the user face image of the target user according to the coordinate error, and use the rotation angle as the posture information of the target user.

The image processing apparatus 2 may further include a first notification module 25.

The first notification module 25 is configured to: acquire historical user face feature point information of the target user, and notify the first determination module 22 to perform the operation of determining the posture information of the target user according to the user face feature point information in a case that the historical user face feature point information is different from the user face feature point information, and use the user face feature point information as new historical user face feature point information.

The image processing apparatus 2 may further include a second notification module 26.

The second notification module 26 is configured to notify the fusion module 23 to perform the operation of fusing the user face image and the original role object into the target role object according to the user face feature point information and the posture information in a case that no historical target role object exists in a role object cache space, and cache the target role object into the role object cache space as the historical target role object.

The second notification module 26 is configured to read the historical target role object from the role object cache space as the target role object in a case that a historical target role object exists in the role object cache space and that a difference between the user face image and a historical user face image of the historical target role object is less than a difference threshold.

For implementations of the specific functions of the second acquisition module 21, the first determination module 22, the fusion module 23, the second determination module 24, the first notification module 25, and the second notification module 26, refer to operation S201 to operation S204 in the above embodiment corresponding to FIG. 4. Details are not described herein.

In an example, the posture information may include a rotation angle.

The fusion module 23 may include an acquisition unit 231 and a fusion unit 232.

The acquisition unit 231 is configured to acquire role face feature point information of the original role object, and scale the user face image according to the role face feature point information and the user face feature point information to obtain an auxiliary face image.

The fusion unit 232 is configured to fuse the auxiliary face image and the original role object into the target role object according to the rotation angle.

In an example embodiment, the fusion unit 232 may include an acquisition subunit 2321 and a mapping subunit 2322.

The acquisition subunit 2321 is configured to acquire auxiliary face feature point information of the auxiliary face image.

The mapping subunit 2322 is configured to align and map the original role object and the auxiliary face image according to the role face feature point information, the auxiliary face feature point information, and the rotation angle, to obtain the target role object. A face shape of the target role object is consistent with a face shape of the target user.

For example, the original role object includes an original role head object and an original role body object. The original role head object includes an original role face object and an original role non-face object.

The fusion unit 232 may include a fusion subunit 2323 and a splicing subunit 2324.

The fusion subunit 2323 is configured to acquire a fusion ratio factor, and align and fuse the original role face object and the auxiliary face image into the target role face object according to the fusion ratio factor and the rotation angle.

The splicing subunit 2324 is configured to splice the target role face object, the original role non-face object, and the original role body object into the target role object. A difference between the face shape of the target role object and the face shape of the target user is determined based on the fusion ratio factor.

When the auxiliary face image and the original role object are fused into the target role object by the acquisition subunit 2321 and the mapping subunit 2322, the fusion subunit 2323 and the splicing subunit 2324 no longer perform the corresponding operations. When the auxiliary face image and the original role object are fused into the target role object by the fusion subunit 2323 and the splicing subunit 2324, the acquisition subunit 2321 and the mapping subunit 2322 no longer perform the corresponding operations.

For implementations of the specific functions of the acquisition unit 231, the fusion unit 232, the acquisition subunit 2321, the mapping subunit 2322, the fusion subunit 2323, and the splicing subunit 2324, refer to operation S204 in the above embodiment corresponding to FIG. 4. Details are not described herein.

Figure 11:
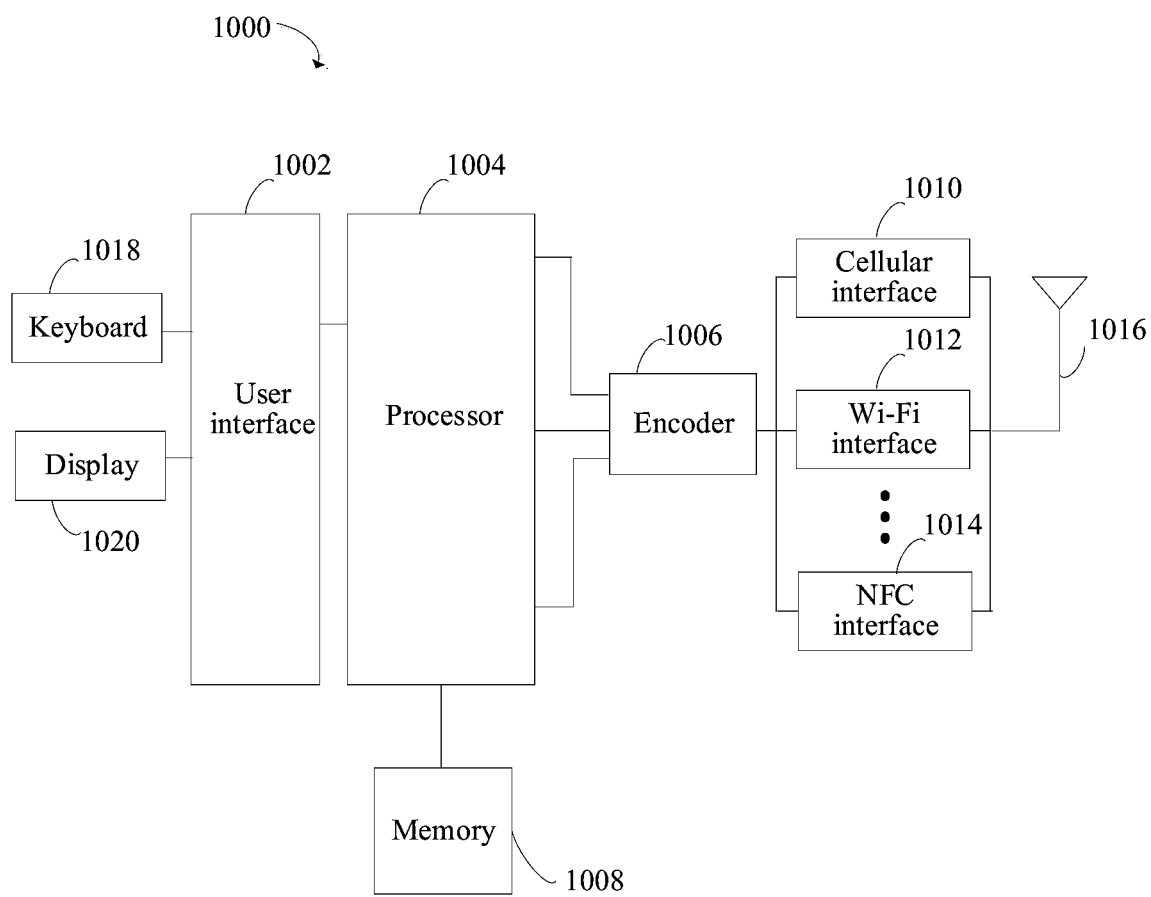
FIG. 11 is a schematic structural diagram of a computer device according to some embodiments.

Further, FIG. 11 is a schematic structural diagram of a computer device according to an embodiment of the disclosure. The terminal device in the embodiments corresponding to FIG. 3 to FIG. 8 may be a computer device 1000. As shown in FIG. 10, the computer device 1000 may include: a user interface 1002, a processor 1004, an encoder 1006, and a memory 1008. A signal receiver 1016 is configured to receive or transmit data by using a cellular interface 1010, a Wi-Fi interface 1012, . . . , or an NFC interface 1014. The encoder 1006 encodes the received data into a data format processed by a computer. The memory 1008 stores a computer program, and the processor 1004 is configured to perform operations in any one of the method embodiments through the computer program. The memory 1008 may include a volatile memory (for example, a dynamic random access memory (DRAM)), and may further include a non-volatile memory (for example, a one-time programmable read-only memory (OTPROM)). In some examples, the memory 1008 may further include memories remotely disposed relative to the processor 1004, and these remote memories may be connected to the computer device 1000 through a network. The user interface 1002 may include: a keyboard 1018 and a display 1020.

In the computer device 1000 shown in FIG. 10, the processor 1004 may be configured to invoke the computer program stored in the memory 1008, to implement the following operations:

displaying a first application page, the first application page including an original role object and a face fusion control;

acquiring a user face image of a target user in a case that the face fusion control is triggered; and displaying a target role object on a second application page, the target role object being obtained by fusing the user face image and the original role object, a display angle of the target role object matching posture information of the target user, and the posture information of the target user being determined according to the user face image.

It is to be understood that, the computer device 1000 described in some embodiments may implement the descriptions of the image processing method in the embodiments corresponding to FIG. 3, or the descriptions of the image processing apparatus 1 in the embodiment corresponding to FIG. 9. Details are not described herein again. In addition, the description of beneficial effects of the same method is not described herein again.

In addition, an embodiment further provides a computer-readable storage medium. For example, the computer-readable storage medium is non-transient. In some embodiments, the computer-readable storage medium is configured to store a computer program executable by the image processing apparatus 1 mentioned above, and the computer program includes program instructions. When a processor executes the program instructions, the method in the embodiment corresponding to FIG. 3 can be performed. For technical details that are not disclosed in the embodiment of the computer-readable storage medium, refer to the descriptions of the method embodiments. In an example, the program instructions may be deployed on one computer device, executed on a plurality of computer devices located at one site, or executed on a plurality of computer devices distributed at a plurality of locations and connected by a communication network. The plurality of computer devices distributed at the plurality of locations and connected by the communication network can form a blockchain system.

According to an aspect of this embodiment, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, so that the computer device can perform the method in the above embodiment corresponding to FIG. 3. Details are not described herein.

Figure 12:
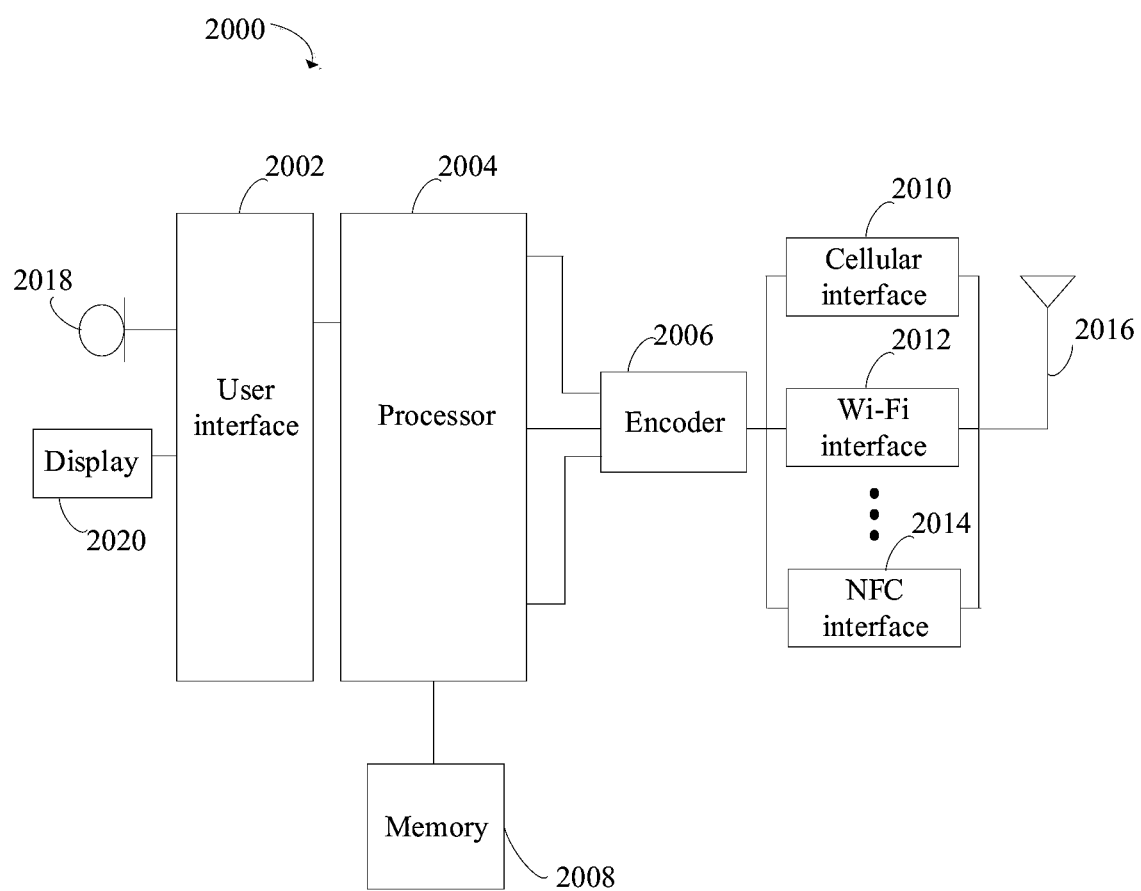
FIG. 12 is a schematic structural diagram of another computer device according to some embodiments.

Further, FIG. 12 is a schematic structural diagram of another computer device according to an embodiment of the disclosure. The server in the embodiments corresponding to FIG. 3 to FIG. 8 may be a computer device 2000. As shown in FIG. 12, the computer device 2000 may include: a user interface 2002, a processor 2004, an encoder 2006, and a memory 2008. A signal receiver 2016 is configured to receive or transmit data by using a cellular interface 2020, a Wi-Fi interface 2012, . . . , or an NFC interface 2014. The encoder 2006 encodes the received data into a data format processed by a computer. The memory 2008 stores a computer program, and the processor 2004 is configured to perform operations in any one of the method embodiments through the computer program. The memory 2008 may include a volatile memory (for example, a dynamic random access memory (DRAM)), and may further include a non-volatile memory (for example, a one-time programmable read-only memory (OTPROM)). In some examples, the memory 2008 may further include memories remotely disposed relative to the processor 2004, and these remote memories may be connected to the computer device 2000 through a network. The user interface 2002 may include: a keyboard 2018 and a display 2020.

In the computer device 2000 shown in FIG. 12, the processor 2004 may be configured to invoke the computer program stored in the memory 2008, to implement the following operations:

acquiring a user face image of a target user and user face feature point information of the user face image;

determining posture information of the target user according to the user face feature point information; and fusing the user face image and an original role object into a target role object according to the user face feature point information and the posture information, and determining a display angle of the target role object matching the posture information.

It is to be understood that, the computer device 2000 described in this embodiment of this application may implement the descriptions of the image processing method in the embodiments corresponding to FIG. 4, or the descriptions of the image processing apparatus 2 in the embodiment corresponding to FIG. 10. Details are not described herein again. In addition, the description of beneficial effects of the same method is not described herein again.

In addition, an embodiment of this application further provides a computer-readable storage medium. For example, the computer-readable storage medium is non-transient. In some embodiments, the computer-readable storage medium is configured to stores a computer program executable by the image processing apparatus 1 mentioned above, and the computer program includes program instructions. When a processor executes the program instructions, the method in the embodiment corresponding to FIG. 4 can be performed.

For technical details that are not disclosed in the embodiment of the computer storage medium of this application, refer to the descriptions of the method embodiments. In an example, the program instructions may be deployed on one computer device, executed on a plurality of computer devices located at one site, or executed on a plurality of computer devices distributed at a plurality of locations and connected by a communication network. The plurality of computer devices distributed at the plurality of locations and connected by the communication network can form a blockchain system.

According to an aspect of this embodiment, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, so that the computer device can perform the method in the above embodiment corresponding to FIG. 4. Details are not described herein.

In some embodiments, when a user triggers a face fusion control, a face image of the user is captured, the face image and an original role object are fused into a target role object, and the target role object is displayed on a page. A display angle of the target role object on the page matches posture information of the target user. It may be learned that, by face fusion, a customized and personalized role object can be realized, and flexibility of game role creation and user participation can be improved. Moreover, since the display angle of the created target role object is determined based on the posture information of the user, real-time interaction between the target role object and the user can be realized, thereby further improving a display effect of the target role object on the page.

A person skilled in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The foregoing embodiments are merely intended for describing the technical solutions of the disclosure, but not for limiting the disclosure. Although the disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of the disclosure.

What is claimed is:

1. An image processing method, performed by a terminal device, comprising:
   displaying a first application page, the first application page comprising an original role object and a face fusion control;
   acquiring a plurality of user face images of a target user in a case that the face fusion control is triggered, the plurality of user face images forming a user face video stream;
   displaying a target role object on a second application page, the target role object being obtained by fusing each user face image and the original role object, a display angle of the target role object matching posture information of the target user, and the posture information of the target user being determined according to each user face image; and
   adjusting the display angle of the target role object on the second application page based on changes in the posture information of the target user in the user face video stream.

2. The image processing method according to claim 1, wherein the second application page further comprises a share control; and
   the method further comprises:
   displaying a user list comprising a plurality of to-be-shared user options in a case that the share control is triggered; and
   transmitting the second application page comprising the target role object to a terminal device corresponding to a target to-be-shared user option in a case that the target to-be-shared user option is triggered, the target to-be-shared user option being any one of the plurality of to-be-shared user options.

3. The image processing method according to claim 1, wherein the displaying a first application page comprises:
   displaying a prop display page comprising a plurality of game props; and
   displaying the first application page in response to a transaction for a target game prop, the original role object on the first application page carrying the target game prop, the target role object on the second application page carrying the target game prop, and the target game object being any one of the plurality of game props.

4. The image processing method according to claim 1, further comprising:
   detecting a number of game props corresponding to the original role object; and
   setting the face fusion control on the first application page to an active state in a case that the number of game props is greater than a preset number threshold.

5. The image processing method according to claim 1, wherein the acquiring comprises:
   capturing the plurality of user face images of the target user in a case that the face fusion control is triggered and the face fusion control is in the active state.

6. An image processing apparatus, comprising:
   at least one memory configured to store instructions; and
   at least one processor communicatively coupled with the memory
   wherein the instructions are configured, when executed by the at least one processor, to cause the image processing apparatus to:
   display a first application page, the first application page comprising an original role object and a face fusion control;
   acquire a plurality of user face images of a target user in a case that the face fusion control is triggered, the plurality of user face images forming a user face video stream;
   display a target role object on a second application page, the target role object being obtained by fusing each user face image and the original role object, a display angle of the target role object matching posture information of the target user, and the posture information of the target user being determined according to each user face image; and adjust the display angle of the target role object on the second application page based on changes in the posture information of the target user in the user face video stream.

7. The image processing apparatus according to claim 6, wherein the second application page further comprises a share control; and wherein the instructions, when executed by the at least one processor, further cause the image processing apparatus to:
display a user list comprising a plurality of to-be-shared user options in a case that the share control is triggered; and
transmit the second application page comprising the target role object to a terminal device corresponding to a target to-be-shared user option in a case that the target to-be-shared user option is triggered, the target to-be-shared user option being any one of the plurality of to-be-shared user options.

8. The image processing apparatus according to claim 6, wherein the display a first application page comprises:
displaying a prop display page comprising a plurality of game props; and
displaying the first application page in response to a transaction for a target game prop, the original role object on the first application page carrying the target game prop, the target role object on the second application page carrying the target game prop, and the target game object being any one of the plurality of game props.

9. The image processing apparatus according to claim 6, wherein the instructions, when executed by the at least one processor, further cause the image processing apparatus to:
detect a number of game props corresponding to the original role object; and
set the face fusion control on the first application page to an active state in a case that the number of game props is greater than a preset number threshold.

10. The image processing apparatus according to claim 6, wherein the acquire comprises:
capturing the plurality of user face images of the target user in a case that the face fusion control is triggered and the face fusion control is in the active state.

11. A non-transitory computer-readable storage medium, storing a computer program that when executed by at least one processor causes the at least one processor to:
display a first application page, the first application page comprising an original role object and a face fusion control;
acquire a plurality of user face images of a target user in a case that the face fusion control is triggered, the plurality of user face images forming a user face video stream; and
display a target role object on a second application page, the target role object being obtained by fusing each user face image and the original role object, a display angle of the target role object matching posture information of the target user, and the posture information of the target user being determined according to each user face image; and
adjust the display angle of the target role object on the second application page based on changes in the posture information of the target user in the user face video stream.

12. The non-transitory computer-readable storage medium according to claim 11, wherein the second application page further comprises a share control; and
the computer program is further configured to cause the at least one processor to:
display a user list comprising a plurality of to-be-shared user options in a case that the share control is triggered; and
transmit the second application page comprising the target role object to a terminal device corresponding to a target to-be-shared user option in a case that the target to-be-shared user option is triggered, the target to-be-shared user option being any one of the plurality of to-be-shared user options.

13. The non-transitory computer-readable storage medium according to claim 11, wherein the display a first application page comprises:
displaying a prop display page comprising a plurality of game props; and
displaying the first application page in response to a transaction for a target game prop, the original role object on the first application page carrying the target game prop, the target role object on the second application page carrying the target game prop, and the target game object being any one of the plurality of game props.

14. The non-transitory computer-readable storage medium according to claim 11, further configured to cause the at least one processor to:
detect a number of game props corresponding to the original role object; and
set the face fusion control on the first application page to an active state in a case that the number of game props is greater than a preset number threshold.

15. The non-transitory computer-readable storage medium according to claim 11, wherein the acquire comprises:
capturing the plurality of user face images of the target user in a case that the face fusion control is triggered and the face fusion control is in the active state.

* * * * *